Jan. 5, 1943.  J. S. McGUIRE  2,307,148
REPAIR PARTS FOR PIPE LINES
Filed May 13, 1940  2 Sheets-Sheet 1
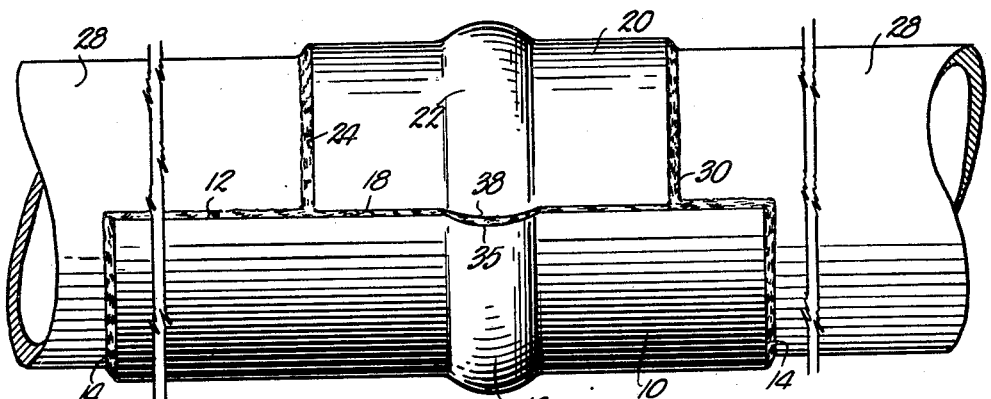
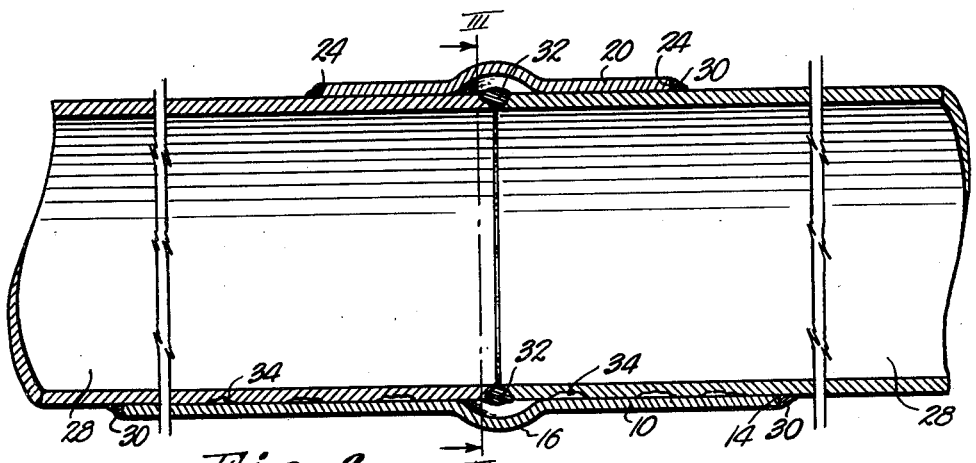
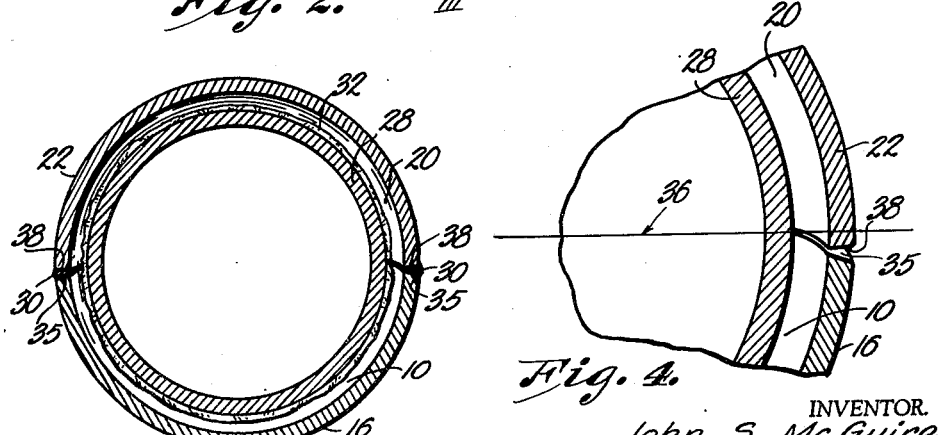
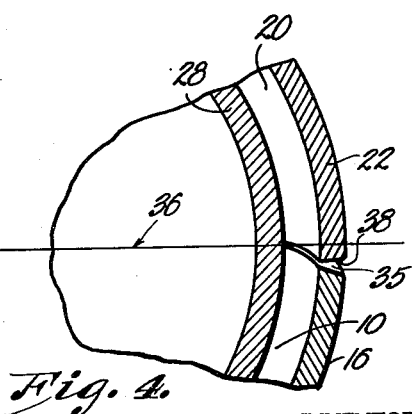
INVENTOR.
John S. McGuire
BY
ATTORNEYS Jan. 5, 1943. J. S. McGUIRE 2,307,148
REPAIR PARTS FOR PIPE LINES
Filed May 13, 1940 2 Sheets-Sheet 2

INVENTOR.
John S. McGuire
BY Hoover & Hamilton
ATTORNEYS

Patented Jan. 5, 1943

2,307,148

UNITED STATES PATENT OFFICE 2,307,148

REPAIR PARTS FOR PIPE LINES

John S. McGuire, Kansas City, Kans., assignor to C. Earl Hovey, Kansas City, Mo., as trustee Application May 13, 1940, Serial No. 334,739

3 Claims. (Cl. 138—99)

This invention relates to the art of repairing pipe lines and has for its primary object the provision of a repair assembly for jointed pipe lines that are used in the transportation of gas and liquids.

The salient aim of the instant invention is to provide repair parts for pipe lines of the aforementioned character, which repair parts may be positioned without stopping the flow of gas or liquid therethrough and without endangering the operator as a result of subjecting the joint of the pipe line to extremely high temperatures due to welding.

Another important object of this invention is the provision of a repair assembly for jointed pipe lines, the component parts of which are formed from initially flat sheets of material in such a manner as to avoid waste and to overcome the possibility of twisting, resulting in the necessity of a straightening operation.

A still further object of the invention is the provision of repair parts for pipe lines, one element of which is relatively long and provided with a bead adjacent to one end thereof, the distance from said end being within certain limits so that the element may be formed from a rectangular piece of stock material without a blanking operation.

Other objects of this invention include the formation of an interengaging sole and cap, both of which have beads provided therein, and each of which is arcuate in transverse cross section to the extent that the body portion extends through an arc of 180° while the beads extend through arcs of more than 180° and less than 180° respectively.

It is an additional object of this invention to provide a specially formed cap for use as a part in a repair assembly for jointed pipes, which cap is produced from a blank that is relatively small in area so that waste of material is reduced to a minimum, said blank being particularly designed to establish a snug fit between the cap which it forms and the hereinabove mentioned sole.

Additional objects of the invention will appear during the course of the following specification, referring to the accompanying drawings, wherein:

Figure 1 is a condensed side elevational view of a length of a jointed pipe line having a repair assembly made in accordance with this invention applied thereto.

Fig. 2 is a longitudinal vertical sectional view through the length of pipe shown in Fig. 1.

Fig. 3 is a transverse cross sectional view taken on line III—III of Fig. 2.

Fig. 4 is an enlarged fragmentary detailed sectional view through a portion of the repair assembly at the zone of connection between the beads of the sole and cap.

Those skilled in the art realize that heretofore the application of so-called half-soles to jointed pipe lines involved welding in the field and further recognize that efforts have been expended to specially produce repair parts for pipe lines that could be economically and safely positioned when the necessity arose, due to actual or possible failure of pipe line material.

It is now the general practice to provide pipe line patches that are sectional in nature, to the extent that the patch parts at the pipe line joint, are applied and thereafter half soles or arcuate lengths of material are then affixed to the pipe line and in many instances, welded to the patch which embraces the joint. Practically all of the welded type repair parts are made under specifications intended to effect economy, but due to the large amount of welding required during placement, the expense of material, manufacture, handling and installation, it is yet unnecessarily high. Blanking dies used to produce many of the so-called half soles or pipe line patches at the present time, are expensive and when material is treated thereby, wastage occurs that must be overcome before welded repair parts for pipe lines will become generally adopted and recognized as desirable by the industry.

Realizing that pipe line sections average 21 ft. in length, and understanding that it is virtually impossible to repair the pipe line without encasing or passing by at least one joint, the principal step forward contemplates the provision of a sole that may be used with or without the cap part of the assembly. It will hereinafter become apparent that cutting of material and girth welding will be reduced to an absolute minimum where the sole is formed as later claimed, and to a length of substantially 14 ft.

Figure 8:
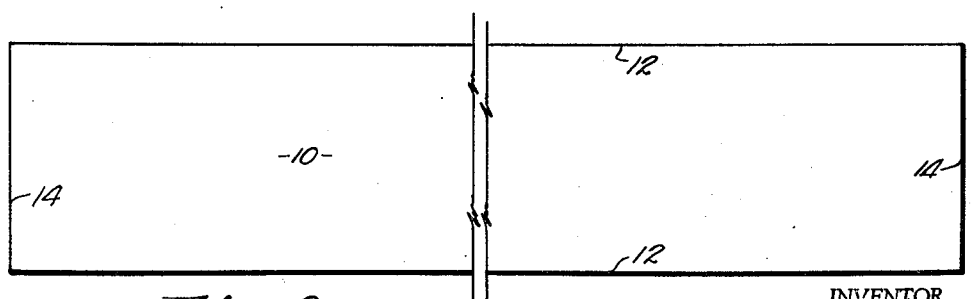
Fig. 8 is a plan view of the blank used in producing the sole of the repair assembly.

In the preferred embodiment of the invention illustrated in Figs. 1 to 5 inclusive, the sole, generally designated by the numeral 10, is formed from a rectangular blank having a straight uninterrupted side and end edges 12 and 14 respectively, as seen in Fig. 8. The length of the blank from which sole 10 is formed, and therefore the sole per se, is 14 f and the width is determined only by the degre of curvature necessary to produce the sole for a pipe of given diameter. In any instance however, the body of sole 10 from edge 12 to edge 12 must extend through an arc of 180. After the appropriate blank has been selected, a transverse bead 16 is pressed therein along a line not more than 18 in. from one end 14 thereof. The reason for limiting this distance lies in the fact that if the bead is pressed into sole 10 at a greater distance from an end 14, twisting will occur and a straightening operation will of necessity be required.

Since the blank from which sole 10 is created is of uniform width throughout its length, the production of transverse bead 16 will cause a contraction of that material between the arcuate longitudinal edges of bead 16. Thus, when sole 10 has been completed, the ends of bead 16 will be spaced inwardly from the plane of edges 12, or in other words, the major portion of bead 16 will extend through an arc of less than 180°.

In practice, it has been found that where ¼ in. material is used and where the bead is ⅜ in. in depth, and further, where the radius of sole 10 is such as to allow a fit to 8 in. pipe, the drop of the ends of bead 16 below edges 12 is .58 in. Obviously, no special blanking die is needed in producing sole 10.

The edges 12 of sole 10 are diametrically opposite and are in abutting relation with the straight portions of edges 18 of cap 20. Cap 20 is transversely arched and has a bead 22 imposed therein at the center of its body.

Figure 7:
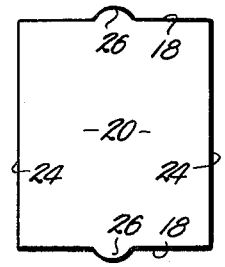
Fig. 7 is a plan view of a blank used in producing the beaded cap.

Cap 20 is produced from a blank such as that illustrated in Fig. 7. Edges 24 of the material join edges 18 and a salient 26 which extends outwardly from each edge 18 respectively, insures an arc of more than 180° when cap 20 is complete. Edges 18 of cap 20 are diametrically opposite and lie in abutting relation with edges 12 of sole 10 when the repair assembly is in place, as shown in Figs. 1, 2 and 3.

The amount of material which must be wasted in the manufacture of cap 20, is represented by the four small pieces that are cut away from the blank to produce salients 26. Thus, one of the important advantages arising from this invention is realized and the cost of material wasted is reduced to a minimum.

The cooperating relation between cap 20 and sole 10 is at once realized when the welder proceeds to secure together abutting edges 18 and 12 along each side of pipe sections 28. Not only will the straight edges of sole and cap 10 and 20 lie close enough to permit spacing to a desired extent by the operator, but the edges at the ends of beads 16 and 22 will likewise be in close proximity so that welding material 30, to precisely the amount necessary, may be introduced between the sole and cap.

All welding material, illustrated in the drawings, is designated by the numeral 30 and edges 24 of cap 20 are welded to pipe sections 28 as are the edges 14 of sole 10 and the portions of edges 12 not in opposed relation with respect to edges 18 of cap 20.

In Figs. 1 to 3 of the drawings, the repair assembly has been illustrated in operative position at a joint between sections 28 that has been produced by welding 32. Pits 34 are covered by sole 10, and if the weld 32 between sections 28 was weakened and required reinforcement, the repair assembly, shown in Fig. 1, is adequate to meet all requirements and to recondition the joint to a point of efficiency equal to that which was present when the pipe line was first constructed.

Reference to Fig. 4 indicates the manner in which an end edge 35 of bead 16 lies below the plane wherein edges 12 and 18 of sole and cap 10 and 20 respectively, are disposed. Line 36 indicates the said plane and also a diametrical line upon which the straight portions of edges 12 and 18 are positioned when sole and cap are in place. Edge 38 of bead 22 lies below this line 36 and when beads 16 and 22 have their ends in register, adequate housing of the joint, which in the instance shown in Fig. 2 is indicated at 32, will take place.

Figure 5:
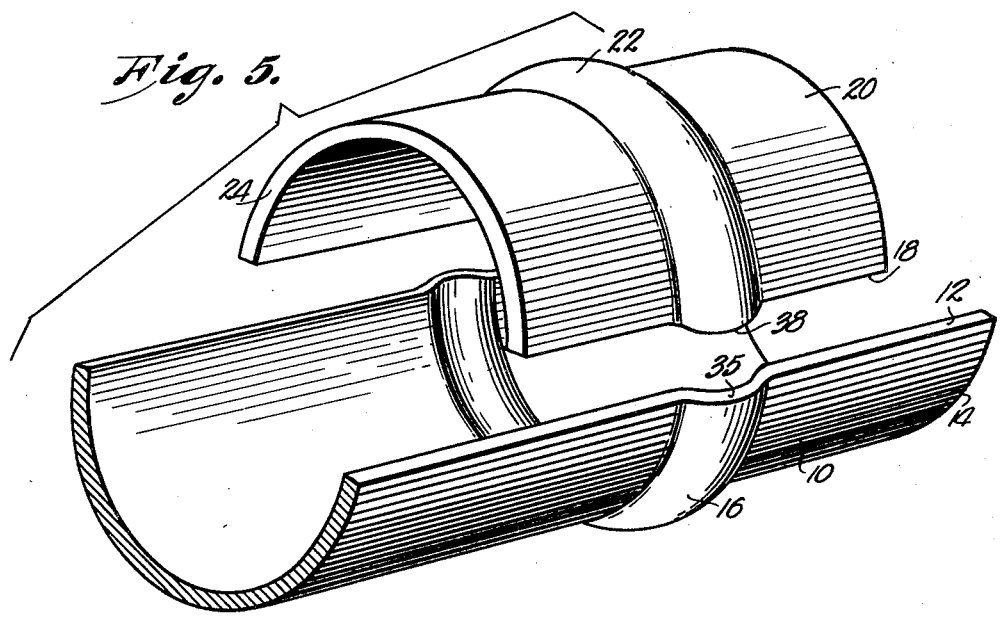
Fig. 5 is a perspective view of the two parts of the repair assembly before applying to the pipe line.
Figure 6:
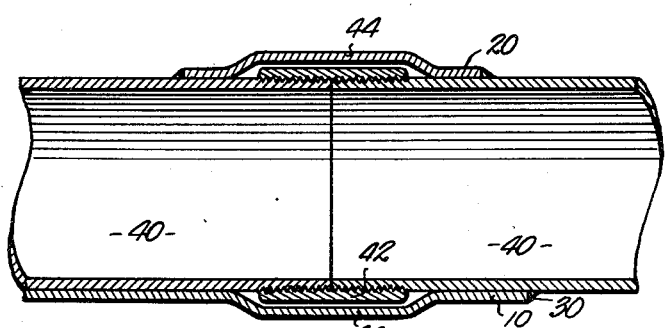
Fig. 6 is a longitudinal sectional view through a length of pipe line having a repair assembly thereon, modified slightly to accommodate the type of joint employed in the particular pipe line.

Fig. 6 illustrates pipe line sections 40 which are secured together by an internally threaded collar 42 of conventional design. Such a joint requires a slightly different type of bead on both sole and cap 10 and 20 respectively, and the cross sectional contour of this bead 44 is as seen in this Fig. 6.

The manner of producing cap 20 from a blank having a salient of a slightly different form, remains the same and again the objects of this invention, with respect to economy of material and manufacture, are realized.

When a sole 10 is positioned at each of two proximal joints of a pipe line, and where it is desired to reinforce the lower half of the pipe line between the adjacent edges of sole 10, it is only necessary to cut an arcuate sheet of material, known as a half-sole, to a length equal to the distance between the said adjacent edges. For example if the length of half-soles 10 is 14 ft., the length of sections 28 is 21 ft., and the distance of bead 16 from one end of sole 10 is 12 in., it is clear that the length of the intermediate arcuate half-sole could be either 7 or 19 ft., depending upon the positioning of soles 10.

With the sole so formed as to create a portion of the joint encasing part, it will always be possible to form a continuous half-sole for a pipe line at a minimum cost regardless of the length of the line.

There is no overlapping of any part of sole or cap 10 or 20, as the case may be, and therefore, a reversal of positions from those shown in Fig. 1 may take place in the field without the necessity of cutting or additional welding.

An understanding of the physical embodiments of the invention illustrated in the accompanying drawings and specified hereinabove, will at once teach those skilled in the art the manner of practicing the invention in ways other than those herein revealed, and therefore, it is desired to be limited only by the spirit of the invention and scope of the appended claims.

Having thus described the invention, what is claimed as new and desired to be secured by Letters Patent is:

1. A cap for a repair assembly for jointed pipe lines comprising an arcuate body of sheet metal, said body having a transverse bead therein, said bead extending through an arc of more than 180°, the remaining portion of the body extending through an arc of 180°.

2. A cap for a repair assembly for jointed pipe lines, comprising an arcuate body formed from a rectangular piece of sheet metal, opposed salients extending outwardly from opposite edges of said rectangular piece of metal, said body having a transverse bead formed to incorporate both salients therein at the ends of said bead, said bead extending through an arc of more than 180°, said body extending through an arc of 180°.

3. A cap for a repair assembly for jointed pipe lines, comprising an arcuate body formed from a rectangular piece of sheet metal, opposed salients extending outwardly from opposite edges of said rectangular piece of metal, said body having a transverse bead formed to incorporate both salients therein at the end of the bead.

JOHN S. McGUIRE.